Figure 2:
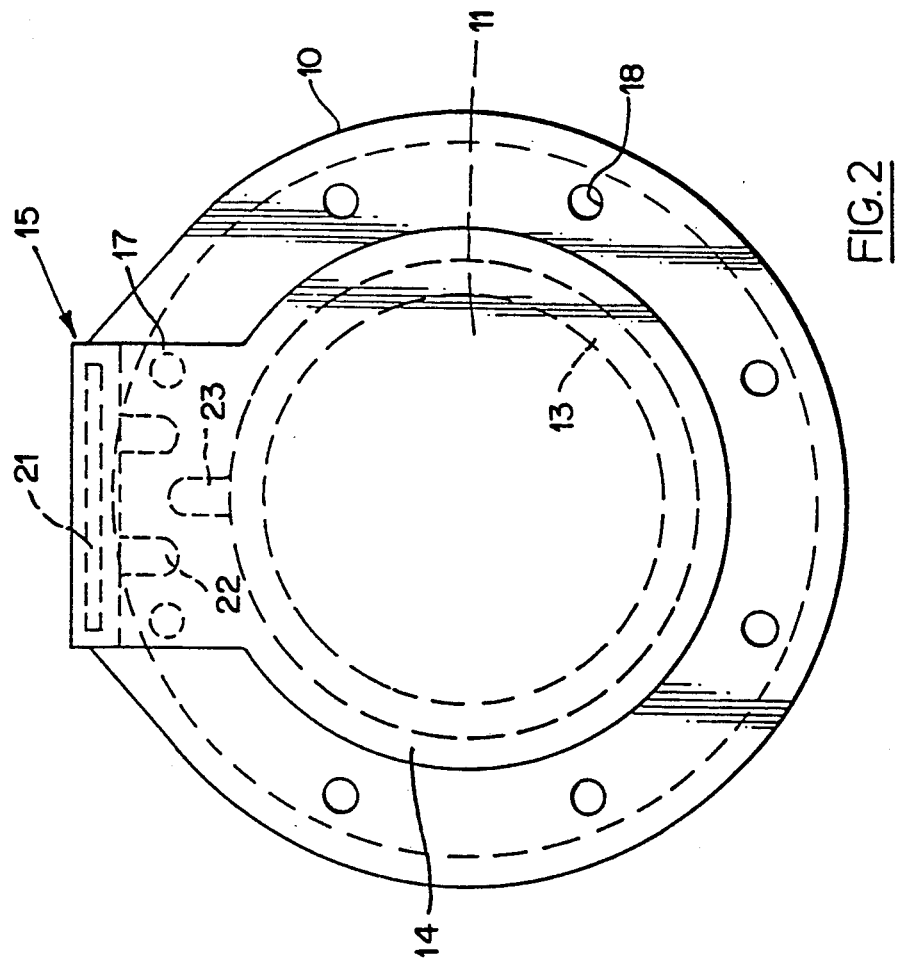

United States Patent [19]
Gardner et al.

[11] Patent Number: 5,117,871
[45] Date of Patent: Jun. 2, 1992

[54] FLAP VALVE

[75] Inventors: Frederick B. Gardner, Redditch; Eric P. Austin, Sandbach, both of United Kingdom

[73] Assignee: Simon-Hartley Limited, Staffordshire, England

[21] Appl. No.: 674,393

[22] Filed: Mar. 25, 1991

[30] Foreign Application Priority Data

Mar. 27, 1990 [GB] United Kingdom ............ 9006765

[51] Int. Cl.⁵ .......................................... F16K 15/14
[52] U.S. Cl. ............................................... 137/855
[58] Field of Search ..................... 137/855, 856, 857

[56] References Cited

U.S. PATENT DOCUMENTS

| | | | |
|---|---|---|---|
| 249,557 | 11/1881 | Truesdell | 137/855 |
| 1,956,691 | 5/1934 | McCune | 137/855 |
| 3,152,608 | 10/1964 | Morrison | 137/855 |
| 3,292,658 | 12/1966 | Scaramucci | 137/856 |
| 4,022,245 | 5/1977 | Davis | 137/855 |

Primary Examiner—Robert G. Nilson
Attorney, Agent, or Firm—Foley & Lardner

[57] ABSTRACT

A flap valve comprising an annular frame (10) defining an opening (11) through which liquid may flow in one direction, a closure flap (14) for said opening connected to the frame (10) by a hinge member (15), and a valve seat (12) against which the closure flap (14) may close to prevent reverse flow of liquid through the opening. The frame (10) may be bolted (at 18) to a wall or pipe flange, with integral sealing ribs (24, 25) on the rear face of the frame avoiding the need for a separate gasket. The entire assembly comprising frame, closure flap, hinge, valve seat and sealing ribs, is integrally moulded from a plastics material and is reinforced where appropriate by embedded steel plates (19, 20 and 21).

6 Claims, 1 Drawing Sheet

FLAP VALVE

This invention concerns flap valves of the kind which may be wall mounted or flange mounted at the end of an otherwise open-ended pipe or duct for discharging liquid into a water course beneath the valve whilst preventing reverse flow of water into the pipe or duct when the water level rises to the same level as the valve.

Flap valves are usually circular and consist of an annular frame surrounding the pipe end, with a closure flap or door hingedly attached to the frame above the opening therein and adapted to rest upon an inclined valve seat which is axially aligned with the pipe or duct.

Whilst, originally, such valves were made predominantly of cast iron or steel, more recently, they have incorporated non-metallic materials such as rigid plastics, and in some cases, flexible hinge strips have been used to attach the closure flap to the frame thus minimizing the use of relatively moving parts. In such cases the flexible hinge strip has been bolted to the closure flap and to the frame, although in one example the hinge was integrally formed with the closure flap, the latter being sufficiently flexible to enable it to deform or curl about one or more horizontal axes, together with the hinge strip.

An object of the present invention is to provide a flap valve generally of the kind described above but wherein the closure flap is rigid so as to prevent it from being deformed into the pipe end, and in which the need for bolting a hinge strip to the door is avoided, thus simplifying the process of manufacture and avoiding an exposed the exposure of metal parts.

According to the present invention there is provided a flap valve comprising a frame defining an opening through which liquid may flow in one direction, a closure flap for said opening connected to the frame by a hinge member, and a valve seat around said opening against which the closure flap may close to prevent reverse flow of liquid through the opening; characterised in that the closure flap is substantially non-flexible; and in that the hinge member is flexible and integrally formed with the closure flap.

Figure 1:
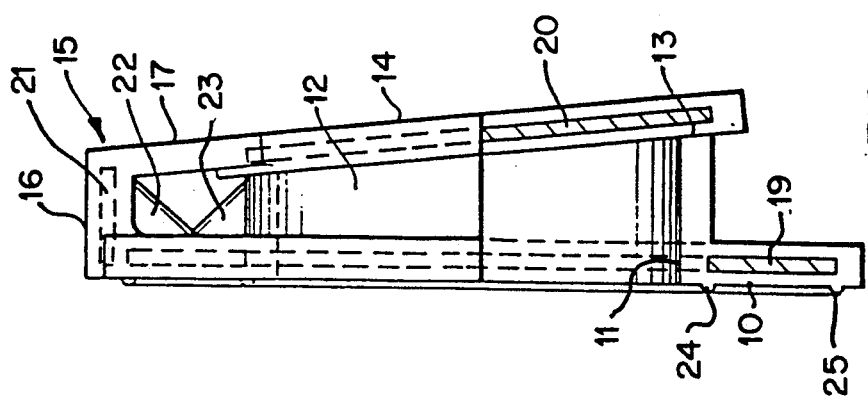

An embodiment of the invention will now be described, by way of example only, with reference to the accompanying drawings in which:

FIG. 1 is a partly sectional side elevation of a flap valve made in accordance with the invention;

and FIG. 2 is a front elevation thereof.

Referring now to the drawings the flap valve essentially comprises an annular frame 10 defining a central opening 11 about which is a short axial collar 12 having an inclined annular seating face 13, and a circular door 14 which closes against the seating face 13 and is connected to the frame 10 by a flexible hinge member generally indicated at 15.

The frame 10, hinge member 15 and door 14 are integrally moulded from a substantially rigid plastic material. The hinge member 15 comprises a generally horizontal top portion 16, extending forwardly from an upper part of the frame 10, and a generally upright portion 17 extending downwardly from the portion 16 to the top of the door 14.

An annular series of bolt holes 18 enable the flap valve to be bolted to a wall or pipe flange about the opening 11.

During the moulding process steel reinforcing plates are integrally formed and embedded within the members of the flap valve. These consist of an annular plate 19 around the frame 10, a disc 20 within the door 14 and a rectangular plate 21 in the top part 16 of the hinge 15. Reinforcing fillets 22 and 23 are provided to strengthen the assembly in the region of the hinge 15.

Moulded annular ribs 24 and 25 on the rear face of frame 10 avoid the need for a separate sealing gasket behind the valve.

It will be seen from FIG. 1 that the thickness of the front portion 17 of hinge 15 is reduced with respect to that of the door 14 to afford additional flexibility in the front part of the hinge which undergoes maximum deformation upon movement of the door from the seat 13.

It will be appreciated that the moulded form of the flap valve ensures that no metal parts are exposed to be corrodible. The flap valve is light in weight when compared with equivalent valves containing greater quantities of metal, or made of cast iron, and there is less likelihood of failure of the hinge since it is integrally moulded with the frame and door as opposed to being attached thereto by bolts or the like. The structural integrity of the frame 10 or door 14 is ensured by the steel reinforcement embedded therein.

It is envisaged that this form of construction may be adopted entirely satisfactorily for a range of sizes of flap valve of between 75 and 600 mm diameter although there is no apparent reason why it should not apply equally to valves which are smaller or greater than this range. While a circular valve has been described and illustrated, the construction may be applied to rectangular flap valves.

It is not intended to limit the invention to the above details. For example, by reducing the depth of top portion 16 of hinge 15 and thus the distance between frame 10 and front hinge portion 17, the reinforcing plate 21 may be omitted thus simplifying the manufacturing process. in this case, also, the slope of door 14 may be increased to ensure more positive seating.

We claim:

1. A flap valve, comprising:
a frame defining an opening through which liquid may flow in one direction;
a closure flap for said opening, the closure flap being joined to the frame by a hinge member, said hinge member including a first part extending forwardly from the frame and a second part substantially normal with the first part and extending coplanar with the closure flap, the first part having a reinforcing plate embedded therewithin;
a valve seat around said opening against which the closure flap is closable to prevent the flow of liquid through the opening in an opposite direction; and
reinforcement plates embedded in the flap and frame, to render said flap and frame substantially non-flexible wherein the frame, closure flap, hinge and valve seat form an integral assembly made of plastic material.

2. A flap valve according to claim 1, in which the hinge member is flexible and integrally formed with the closure flap.

3. A flap valve according to claim 1, including integrally moulded ribs on a rear face of the frame to effect a seal upon fixing the frame to a wall or pipe flange.

4. A flap valve according to claim 1, wherein said valve seat is provided on an open end of an annular collar integrally formed with said frame.

5. A flap valve according to claim 1, in which the said second part of the hinge member is reduced in thickness with respect to the flap valve.

6. A flap valve, comprising:
- a frame defining an opening through which liquid may flow in one direction;
- a closure flap for said opening, the closure flap being joined to the frame by a hinge member; p1 a valve seat around said opening against which the closure flap is closable to prevent the flow of liquid through the opening in an opposite direction;
- reinforcement plates embedded in the flap and frame, to render said flap and frame substantially non-flexible wherein the frame, closure flap, hinge and valve seat form an integral assembly made of plastic material; and
- integrally moulded reinforcing fillets to strengthen the assembly in the region of the hinge area.

* * * * *